United States Patent [19]
Takahasi et al.

[11] 4,112,478
[45] Sep. 5, 1978

[54] HIGH-TEMPERATURE DETECTING APPARATUS

[75] Inventors: Toru Takahasi, Mito; Sadayasu Ueno; Tomoji Inui, both of Katsuta, all of Japan

[73] Assignee: Hitachi, Ltd., Japan

[21] Appl. No.: 780,328

[22] Filed: Mar. 23, 1977

[30] Foreign Application Priority Data

Mar. 24, 1976 [JP] Japan .................................. 51-31253

[51] Int. Cl.$^2$ ............................................. H01N 35/00
[52] U.S. Cl. ...................................... 361/162; 73/361; 136/233; 307/117; 340/595
[58] Field of Search ............. 73/359 R, 361; 136/232, 136/233; 307/117; 340/228 R; 361/162

[56] References Cited
U.S. PATENT DOCUMENTS

| | | | |
|---|---|---|---|
| 3,821,562 | 6/1974 | Davis et al. ................. | 340/228 R X |
| 3,829,849 | 8/1974 | Stauffer ....................... | 340/228 R X |
| 3,883,753 | 5/1975 | Harrison, Jr. et al. ...... | 340/228 R X |
| 3,921,453 | 11/1975 | Platzer, Jr. ................. | 340/228 R X |

*Primary Examiner*—Leland A. Sebastian
*Attorney, Agent, or Firm*—Craig & Antonelli

[57] ABSTRACT

A high-temperature detecting apparatus most suitably used with a system for protecting a catalytic apparatus provided for purifying exhaust gas of an automobile is disclosed. A reed relay coil is connected between the cold junctions of a thermocouple in such a manner that the reed relay is driven directly by an electromotive force generated in the thermocouple due to heat in the exhaust gas. The thermocouple and the reed relay are integrally arranged by means of a metal cover. This arrangement reduces the connection resistance between the thermocouple and the coil, thereby making it possible to directly drive the reed relay by the output of the thermocouple.

8 Claims, 13 Drawing Figures

HIGH-TEMPERATURE DETECTING APPARATUS

BACKGROUND OF THE INVENTION

1. Field of the Invention

This invention relates to a high-temperature detecting apparatus for detecting the temperatures of a high-temperature fluid as high as 500° to 1,200° C, or more in particular to a high-temperature detecting apparatus suitable as an overheat alarm for an exhaust gas system of an automobile engine.

2. Description of the Prior Art

A conventional overheat alarm for an exhaust gas system of an automobile employs a high-temperature detecting apparatus including a combination of an electronic switching circuit and a high-temperature thermistor or a thermocouple. Such an apparatus includes a separate sensor section and a separate electronic circuit section and therefore its mounting and wiring on the car body are time-consuming work. In addition to this problem, the sensor is expensive. Also, various measures are required to be taken on the sensor and circuit sections for prevention of operating errors due to water absorption or electric noise, thus further complicating the construction of the apparatus. This unavoidably increases the overall cost of the apparatus and makes it difficult to meet the requirements for high reliability and low cost of the apparatus for use with the automobile.

SUMMARY OF THE INVENTION

Accordingly, it is an object of the present invention to provide a high-temperature detecting apparatus with a simple construction for use with the automobile.

Another object of the invention is to provide a highly reliable high-temperature detecting apparatus for the automobile.

Still another object of the invention is to provide a low-cost high-temperature detecting apparatus.

Further objects of the invention will be made apparent from the description below made with reference to the accompanying drawings.

According to the present invention, there is provided a high-temperature detecting apparatus in which a thermocouple and a reed relay are secured integrally and a reed relay coil is connected between the cold junction terminals of a thermocouple. Since the reed relay is driven directly by the output of the thermocouple, the apparatus is not affected by the variations in the battery voltage, thereby ensuring stable operation of the reed relay. Instead of driving the reed relay directly in response to the output of the thermocouple, a bias magnetic field may alternatively be applied to the reed relay by the current from a permanent magnet or battery.

DESCRIPTION OF THE PREFERRED EMBODIMENTS

Figure 1:
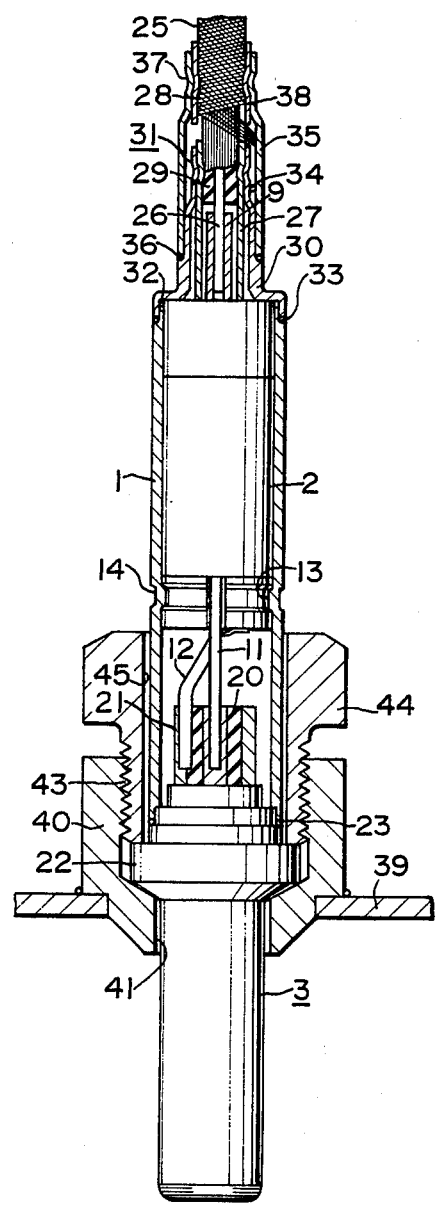
FIG. 1 is a longitudinal sectional view showing the whole construction of an embodiment of the high-temperature detecting apparatus according to the present invention.

Referring to FIG. 1, a cylindrical reed relay 2 is placed in a tubular metal casing 1. One end of a thermocouple 3 is securely welded to the metal casing so that the thermocouple 3 and the reed relay 2 are integrally constructed by means of the metal casing 1.

Figure 2:
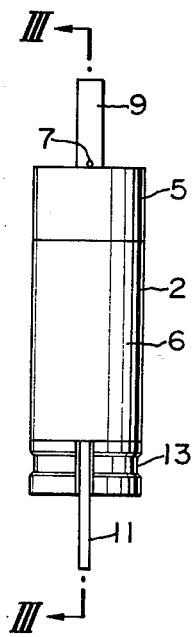
FIG. 2 is a front view showing a reed relay.
Figure 3:
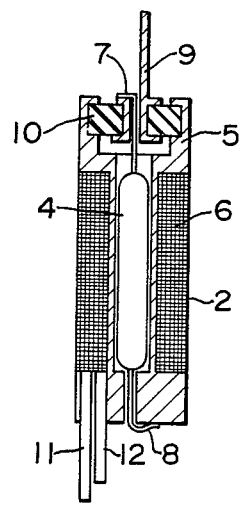
FIG. 3 is a sectional view taken along the line III — III of FIG. 2.

The reed relay 2, as shown in FIGS. 2 and 3, includes an ordinary reed switch 4 inserted in a non-magnetic, electrically conductive coil bobbin 5 on which a coil 6 is wound. A couple of reed pieces 7 and 8 of the reed switch 4 are extended in opposite directions from the ends of a glass tube. The reed piece 7 is connected to a switch terminal 9 made of a conductive material, while the other reed piece 8 is connected to the bobbin 5 made of an electrically conductive, non-magnetic material. The switch terminal 9 is supported on the bobbin 5 through an insulating member 10. Lead wires 11 and 12 of the coil 6 are made of conductors large in diameter and taken out from one end of the reed relay, the end being nearer to the thermocouple 3 than the other end. As a result, the reed relay 2 assumes a cylindrical shape as a whole. Also, the coil lead wires 11 and 12 are taken out from one end of the reed relay 2, while the switch terminal 9 is taken out from the other end thereof. Further, a recess 13 formed in the lower flange of the bobbin 5 is integrally riveted to the riveting section 14 of the casing 1.

Figure 4:
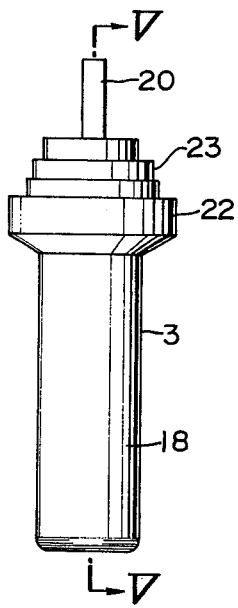
FIG. 4 is a front view of a thermocouple.
Figure 5:
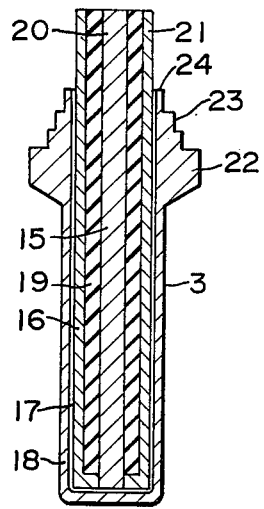
FIG. 5 is a sectional view taken along the line V — V in FIG. 4.
Figure 6:
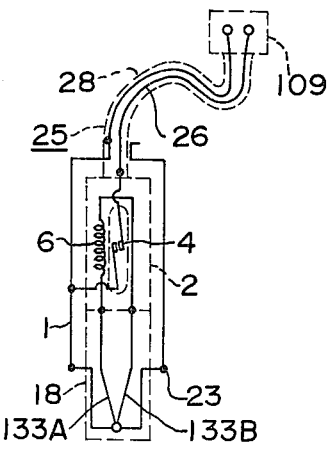
FIG. 6 is a diagram for explaining the principle of another embodiment of the present invention.
Figure 7:
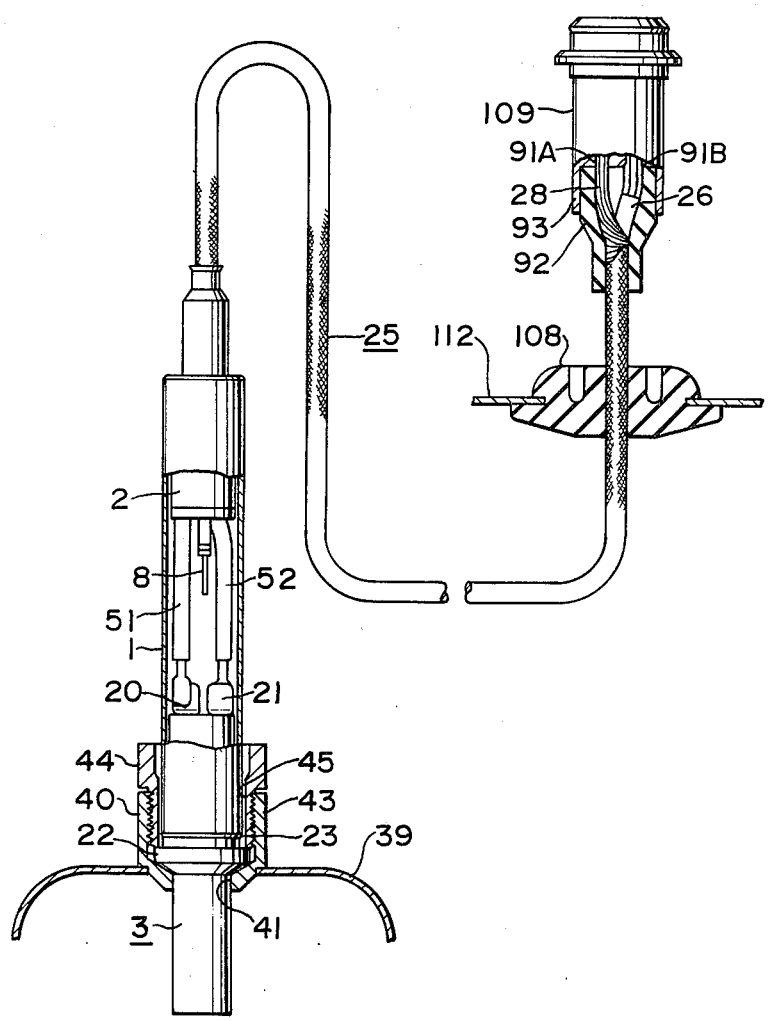
FIG. 7 is a diagram showing the whole construction of another embodiment of the invention.

The thermocouple 3, as shown in FIGS. 4 and 5, comprises a couple of thermocouple members 15 and 16 coupled to each other at their one ends, an insulating film 17 made of such a material as an oxide film on the periphery of the thermocouple members 15 and 16, and a protective cylinder 18 covering the insulating film 17. The thermocouple members 15 and 16 are made of such materials as alumel and chromel, or constantan and chromel respectively, and are arranged coaxially. The inner thermocouple member 15 takes the form of a rod, and the outer thermocouple member 16 takes the form of a tube. An insulating layer 19 is inserted between the thermocouple members 15 and 16. The insulating layer 19 is preferably formed of magnesia or alumina powder or takes the form of a ceramic tube. Open ends of the thermocouple members 15 and 16 include thermocouple terminals 20 and 21 in a flat plate form. The terminals 20 and 21 are connected by spot welding or similar method to the coil lead wires 11 and 12, and function as the cold junctions of the thermocouple. The protective cylinder 18 is made of a heat-resistant material and has a bottom at its one end, and further has a flange-like mount 22 with a conical lower part in the vicinity of the open end of the cylinder 18. A stepped portion 23 smaller in diameter than the mount 22 is provided on the mount 22. The stepped portion 23 is secured by welding or like method to the lower end of the metal casing 1. Further, at the open end of the protective cylinder 18, the protective cylinder 18 and the outer thermocouple member 16 are coupled to each other by welding or other similar method through the junction 24.

A core wire 26 of a coaxial conductor 25 as a lead wire is connected by spot welding or like means to the switch terminal 9 of the reed relay 2. The outer periphery of the connecting section is covered with a lead insulating member 27. The upper end of the lead insulating member 27 is fitted on the insulating member 29 for insulating the core wire 26 of the coaxial conductor 25 and the outer conductor 28 from each other. The outer periphery of the lead insulating member 27 is covered with a guide metal 30 made of a stepped metal tube. The upper end of the guide metal 30 is riveted by the riveting section 31 thereby securing the lead insulating member 27 to the insulating member 29. The lower end of the guide metal 30, on the other hand, is fitted over the connecting section 32 at which the outer casing 1 and the bobbin 5 of the reed relay 2 are connected by spot welding or like means. The lower end of the guide metal 30 is also connected by spot welding or like means to the outer casing 1 at the connecting section 33. The upper connecting portion 34 of the guide metal 30 is connected by being intertwined with the lower end of the outer conductor 28 of the coaxial conductor 25 by spot welding or like means. The outer periphery of the guide metal 30 is covered with the cap 35. The lower end of the cap 35 is secured to the guide metal 30 at the connecting portion 36 by spot welding or like means, while the coaxial conductor 25 is riveted via a cushion 38 to the upper end of the cap 35 by means of the riveting section 37.

The high-temperature detecting apparatus with this construction is inserted, for instance, into a mounting boss 40 coupled to a partition wall 39 functioning as an outer wall of the catalytic converter of an automobile. In this case, the thermocouple 3 is projected inwardly of the partition wall 39 by way of the aperture 41 of the mounting boss 40, and the mounting seat 22 of the protective cylinder 18 is engaged with the bottom wall of the mounting boss 40. The mounting seat 22 is secured to the mounting nut 44 screwed to the thread 43 in the upper inner wall of the mounting boss 40. The nut 44 has a through hole 45 through which the outer casing 1 is passed, and has a hexagonal upper periphery.

Operation of the embodiment under consideration will be explained. When the temperature of the inside of the partition wall 39 making up the outer wall of the catalytic converter or like increases, the thermocouple 3 generates an electromotive force, so that current flows in the coil 6 through the coil lead wires 11 and 12. A magnetic field is generated in the coil 6, thereby making the reed pieces 7 and 8 of the reed switch 4 to be in contact to be electrically conductive. The core wire 26 of the coaxial conductor 25 is connected with the outer conductor 28 of the coaxial conductor 25 through the switch terminal 9, the reed pieces 7 and 8, the coil bobbin 5, the outer casing 1 and the guide metal 30, thereby producing a switching signal. In the process, the operating point of the reed switch 4 is set so that the thermocouple 3 is actuated by the magnetic force generated in the coil 6 by the current generated at a predetermined temperature.

According to this embodiment, the thermocouple 3 and the reed relay coil 6 are connected directly to each other by means of the coil lead wires 11 and 12 relatively large in diameter. Therefore, as compared with the conventional apparatus in which a reed relay and a thermocouple separately formed are connected by means of an elastic conductor, the connection resistance is minimized, resulting in a very high efficiency and smaller outer dimensions. Further, the fact that the connecting portion between the coil 6 and the thermocouple 3 is not exposed protects the apparatus from variations in the resistance of the closed circuit, hence, the variations in operating temperature due to an outer damage, thus permitting a long stable operation. Furthermore, the integrated construction of the apparatus greatly reduces the number of steps for mounting the detecting apparatus on the partition wall 39.

In embodying the invention, the metal casing 1 is not limited to the cylinder in shape but may take another shape. Also, the conductor 25 may take another form than a coaxial one as a lead wire. In addition, the mounting structure of the detecting apparatus may be in any other form.

Next, another embodiment of the present invention will be described with reference to FIGS. 6 – 11. A reed relay 2 is placed in a tubular metal casing 1. The stepped portion 23 of the thermocouple 3 and one end of the metal casing 1 are welded to each other, so that the thermocouple 3 and the reed relay 2 are integrated into a single rigid body. An elastic conductor 25 for producing a switching signal is taken out from the other end of the metal casing 1 and connected to the connector 109.

Figure 8:
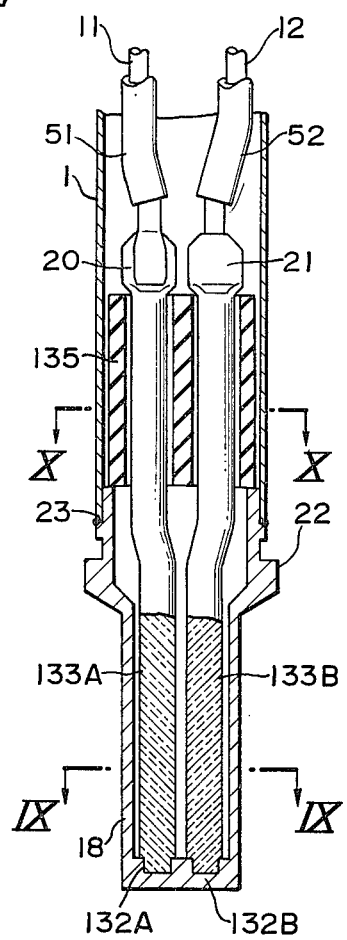
FIG. 8 is a longitudinal sectional view of the thermocouple shown in FIG. 7.
Figure 9:
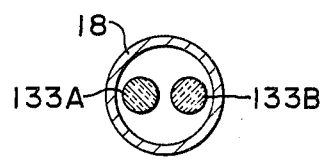
FIG. 9 is a sectional view taken along the line IX — IX in FIG. 8.
Figure 10:
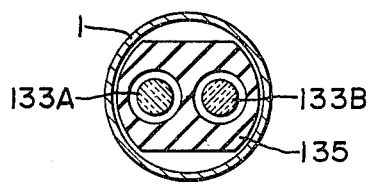
FIG. 10 is a sectional view taken along the line X — X in FIG. 8.
Figure 11:
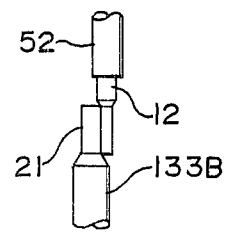
FIG. 11 is a diagram showing the connection of the coil lead wire and the thermocouple terminals.

The thermocouple 3, as shown in FIGS. 8 to 10, includes a couple of linear thermocouple members 133A and 133B isolated from each other by a solid insulating member 135 and inserted in a bottomed tubular protective cylinder 18 or a cylinder having a bottom at its one end. One end of each of the thermocouple members 133A and 133B is welded by resistance welding or like method to the internal bottom of the protective cylinder 18, thereby making up the thermocouple contacts 132A and 132B. One end of the solid insulating member 135 is fitted on the open end of the protective cylinder 18. The other end of each of the thermocouple members 133A and 133B, on the other hand, is formed flat and, making up the thermocouple terminals 20 and 21, and is secured to the solid insulating member 135. The terminals 20 and 21, as shown in FIGS. 8 and 11, are welded to the coil lead wires 11 and 12 of the reed relay 2 by resistance welding or like method. The protective cylinder 18 is made of a high-temperature anticorrosive metal such as stainless steel AISI 310 and has, in the neighbourhood of the opening end thereof, a flange-like mounting seat 22 with a conical bottom surface. A stepped portion 23 smaller in diameter than the mounting seat 22 is provided on the mounting seat 22.

Figure 12:
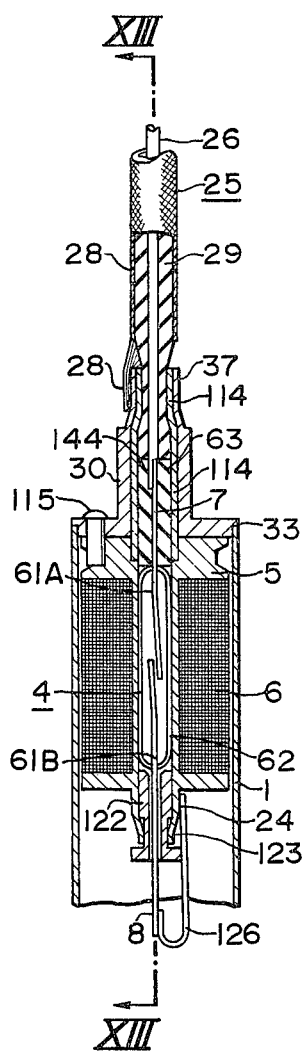
FIG. 12 is a longitudinal sectional view showing the reed relay and an elastic conductor shown in FIG. 7.
Figure 13:
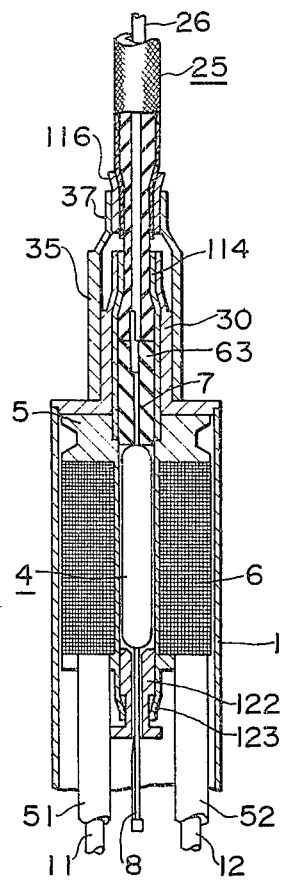
FIG. 13 is a longitudinal sectional view taken along the line XIII — XIII in FIG. 12.

As shown in FIGS. 12 and 13, the reed relay 2 includes a reed switch 4, an electrically conductive, non-magnetic bobbin 5 containing the reed switch 4, and a coil 6 wound on the bobbin 5. A couple of reed pieces 61A and 61B of the reed switch 4 are taken out in opposite directions from the sealed ends of the glass tube 62. The reed piece 61B is connected through the conductive piece 126 to the bobbin 51 of an electrically conductive, non-magnetic material such as a stainless steel, while the other reed piece 61A projected from the other end of the bobbin 5 makes up a terminal 7. The coil 6 and the lead wires 11 and 12 thereof are made of conductors with a large diameter and the wires 11 are taken out from one end of the reed switch, which end is nearer to the thermocouple than the other end. The conductor making up the coil 6 has a small resistivity and is covered with a heat-resistant film such as polyimide. An insulating member in the form of a glass fiber film is interposed between the coil 6 and the bobbin 5. The lead wires 11 and 12 have tubular coil lead insulating members 51 and 52 of a glass fiber, and the whole assemblage is treated by immersion in silicon varnish. A tubular spacer 122 is further fitted in the reed piece 61B side of the bobbin 5 and secured to the bobbin 5 by means of the riveting section 123, thereby placing the reed switch 4 in position in the axial direction. A knock pin 115 of a conductive material is welded to the vicinity of the outer periphery of the reed piece 61A in such a manner as to project in the axial direction. The whole structure of the reed relay 2 thus assumes a cylindrical form, and the coil lead wires 11 and 12 are taken out in one direction, while the reed piece 7 and the knock pin 115 are taken out in the other direction as switch terminals. The assemblage has a heat-resistant insulating property even at high temperatures.

The reed piece 61A of the reed relay 2 is connected with a central conductor 26 of the coaxial elastic conductor 25 by resistance welding or like method as a lead conductor. The outer periphery of the internal connecting section 144 is covered with a film-like lead insulating member 63, which in turn is covered with an elastic seal 114 in tubular form. The upper end of the seal 114 is covered with an insulating member 29 for insulating the central conductor 26 of the coaxial elastic conductor 25 from the outer conductor 28.

The stepped tubular guide metal 30 is welded to the outer casing 1 at the stepped portion 33. The guide metal 30 has an inner diameter corresponding to the outer diameter of the seal 114. In the neighbourhood of the outer periphery of the stepped portion 33, an aperture corresponding to the knock pin 115 protruded near the outer periphery at the top of the bobbin 5 is formed. The upper end of the guide metal 30 is provided with a riveting section 37. The guide metal 30 is fitted over the metal casing 1 in such a manner as to cover the reed relay 2, while at the same time taking out the elastic lead wire 25. The other end of the outer casing 1 and the thermocouple 3 are welded or otherwise secured to each other at the stepped portion 23. At the riveting section 37 of the guide metal 30, the insulating member 29 of the elastic conductor 25 and the central conductor 26 are securely riveted to each other via the seal 114. Next, the lower end 45 of the outer conductor portion 28 of the elastic conductor 25 is twisted and welded to the riveting section of the guide metal 30 by resistance welding or like method. The knock pin 115, on the other hand, is projected through the upper face of the flanged part of the guide metal 30. This projected part is welded to the guide metal 30.

Further, the outer periphery of the guide metal 30 is covered with a tubular cap 35. The lower part of the tubular cap 35 is pressed into the guide metal 30. The riveting section 37 at the upper end of the cap 35 rivets the elastic conductor 25 through a tubular cushion 116.

The high-temperature detecting apparatus with this construction is, for instance, inserted in the mounting boss 40 coupled to the exhaust pipe of the engine or catalytic converter of the automobile. In such a case, the thermocouple 3 is projected through the through hole 41 of the mounting boss 40 inwardly of the partition wall 39 or exhaust pipe and the mounting seat 22 is engaged with the bottom wall of the mounting boss 40. The mounting seat 22 is fixed with the free nut 44 screwed to the threaded portion 43 in the upper inner wall of the mounting boss 40. The nut 44 has within it a through hole 45 through which the outer casing 1 passes, and the upper periphery thereof is formed in hexagon or like shape. A grommet 108 is fitted in the midway of the elastic conductor 25, and one end thereof is provided with a connector 109 including terminals 91A and 91B, bush 92 and housing 93. The connector 109 is led into the automobile through the opening of the car partition wall or floor 112, and the elastic conductor 4 is riveted to the car partition wall 112 by means of the grommet 108.

The operation of the embodiment under consideration will be explained below.

With the increase in the temperature of the inside of the exhaust pipe 39, an electromotive force is generated at the end terminals 20 and 21 of the thermocouple 3, so that current flows in the coil 6 through the lead wires 51 and 52. A magnetic field is generated within the coil 6, thereby producing an attractive force between the reed pieces 61A and 61B of the reed switch 4. The operating point where the reed pieces 61A and 61B begin to conduct is so set in advance as to correspond to the force of a magnetic field generated in the coil 6 due to the current generated at a predetermined temperature of the hot junction 132 of the thermocouple 3. The reed piece 61A of the reed switch 4 is connected with the connector terminal 91B through the central conductor 26 of the elastic conductor 25, while the other reed piece 61B thereof is connected with the connector terminal 91A through the conductor piece 126, the bobbin 5, the knock pin 115 and the outer conductor 28. A switching signal indicating that the hot junction 132 of the thermocouple 3 has reached the predetermined temperature is produced between the terminals 91A and 91B.

According to the embodiment under consideration, the thermocouple 3 is connected directly with the reed relay coil 6 by means of the coil lead wires 51 and 52 comparatively large in diameter. The connection resistance is thus minimized with an improved efficiency and the outer dimensions are reduced, as compared with the conventional apparatus in which the reed relay 2 and the thermocouple 3 are separately formed and connected with each other by means of elastic conductors. Further, in the present invention, since the connection between the coil 6 and the thermocouple 3 is not exposed, the closed circuit resistance and hence the operating temperature does not undergo any change in the presence of an outer damage. Also, the fact that the whole structure is covered with a rigid material prevents any adverse effect on the operation of the apparatus due to a damage. Another advantage of this embodiment is the long stable operation even against a high-temperature variation due to the fact that each connection is formed by welding and electric insulation property is high even at high temperatures and that the insulating distance is well maintained between the thermocouple terminals. The integral construction, the elasticity of the external wirings and the use of only two lead wires of course combine to greatly reduce the number of steps for wiring on the car body on the one hand and the simple construction of the whole apparatus permits production thereof at low cost on the other hand. Furthermore, the hermetic structure of the lead section of the elastic conductors prevents any corrosive fluid from penetrating the reed relay or the interior of the thermocouple, thus protecting the inside of the apparatus from any corrosion or deterioration in a flooded condition. Still another advantage is that the hot junction 132 of the thermocouple 3 is welded to the inner bottom surface of the protective cylinder 18 for the purpose of grounding, which prevents corrosion by high-temperature exhaust on the one hand and improves response and uniformity as compared with the nongrounded type on the other hand. An additional advantage is derived from the fact that the reed relay 2 and the terminals 20 and 21 which are the cold junctions of the thermocouple 3 are contained in the metal casing 1. Due to this fact, the temperatures of the respective parts are determined primarily by the heat transmission from the hot junction 132, with the result that the electromotive force, the resistance of the closed circuit, hence the operating temperature almost does not change with the environmental temperature.

In embodying the present invention, the metal casing 1 is not limited to a metal cylinder but may take another shape. Also, the coil bobbin 5 may use another non-magnetic material other than a metal. Further, the elastic conductor 25 is not necessarily coaxial. Furthermore, the mounting structure of the apparatus with respect to the exhaust pipe 39 and the partition wall 112 of the car body may be in any other form. The structure of the connector may be formed also in another form. In addition, the metal casing 1 may take the form of a magnetic metal tube containing the coil. This not only improves the magnetic efficiency but also stabilizes the operating temperature against variations in environmental temperature.

The high-temperature detecting apparatus according to the present invention, with the aforementioned construction, is very reliable and low in cost.

The present invention is such that the reed relay coil is driven directly by the output of the thermocouple. The electromotive force of the thermocouple is so small that a bias magnetic field may be applied in advance to the reed switch 4 as required. In such a case, the bias may be produced either by the use of a permanent magnet or by the bias current derived from a biasing relay coil. Even when these measures are taken, it is still necessary to reduce the internal resistance of the connecting circuit between the thermocouple and the reed relay coil as in the embodiment under consideration. According to the invention, the internal resistance of the connecting circuit is reduced by integrated structure of the thermocouple and the reed relay.

Further, as shown in FIGS. 1 and 8, the reed switch has a larger diameter than the protective tube inserted into the exhaust pipe of the thermocouple, and therefore the coil winding of the reed switch may be enlarged in diameter, thereby reducing its internal resistance.

We claim:

1. A high-temperature detecting apparatus comprising a thermocouple capable of generating an electromotive force by a temperature difference between the hot and cold junctions thereof, an electromagnetic coil, a reed switch disposed within said electromagnetic coil, first connecting means for connecting said electromagnetic coil to said cold junctions of said thermocouple thereby to form a closed loop, lead means for taking out an electrical signal indicative of the operation of the contacts of said reed switch, said electromagnetic coil being excited thereby to actuate said reed switch in response to an increase in the temperature difference between said hot and cold junctions of said thermocouple, said actuation being transmitted outside by said lead means; said apparatus further comprising casing means, means for fixing said thermocouple to said casing means, means for fixing said reed switch and said electromagnetic coil to said casing means, and means for fixing the reed switch side terminal of said lead means to said casing means.

2. A high-temperature detecting apparatus according to claim 1, further comprising means for mechanically connecting said casing means to a part of exhaust means of an engine, an aperture formed in the partition wall of the car body carrying said engine for passing said lead means through said partition wall, and connecting means provided at one end of said lead means.

3. A high-temperature detecting apparatus according to claim 2, in which said lead means includes an outer conductor electrically connected to a reed piece on the thermocouple side of said reed switch, and a core wire electrically connected to a reed piece on the other side of said reed switch.

4. A high-temperature detecting apparatus according to claim 2, in which said means for fixing said thermocouple to said casing means includes a protective tube having a mounting seat, said thermocouple being disposed in said protective casing, said engine exhaust means is provided with a mounting boss so that said mounting seat of said protective tube is mechanically secured to said mounting boss by means of a mounting nut.

5. A high-temperature detecting apparatus according to claim 4, in which said protective tube includes a bottom part for connecting one end of said thermocouple electrically, thereby forming a hot junction of said thermocouple.

6. A high-temperature detecting apparatus according to claim 5, further comprising a solid insulating member for fixing the cold junctions of said thermocouple, the ends of said cold junctions being flattened, each of the ends of said lead wires of said electromagnetic coil being also flattened, the surface of said flattened part of said thermocouple being connected to the surface of said flattened part of said lead wires of said coil.

7. A high-temperature detecting apparatus according to claim 4, in which said thermocouple is coaxially arranged in the form of a circular tube within said protective tube.

8. A high-temperature detecting apparatus according to claim 3, further comprising a coil bobbin made of a metal, said reed piece of said reed switch on the thermocouple side being connected to said bobbin, said casing means being made of a metal, said bobbin being electrically connected to said casing means, said metal casing means being electrically connected to an external conductor.

* * * * *